UNITED STATES PATENT OFFICE.

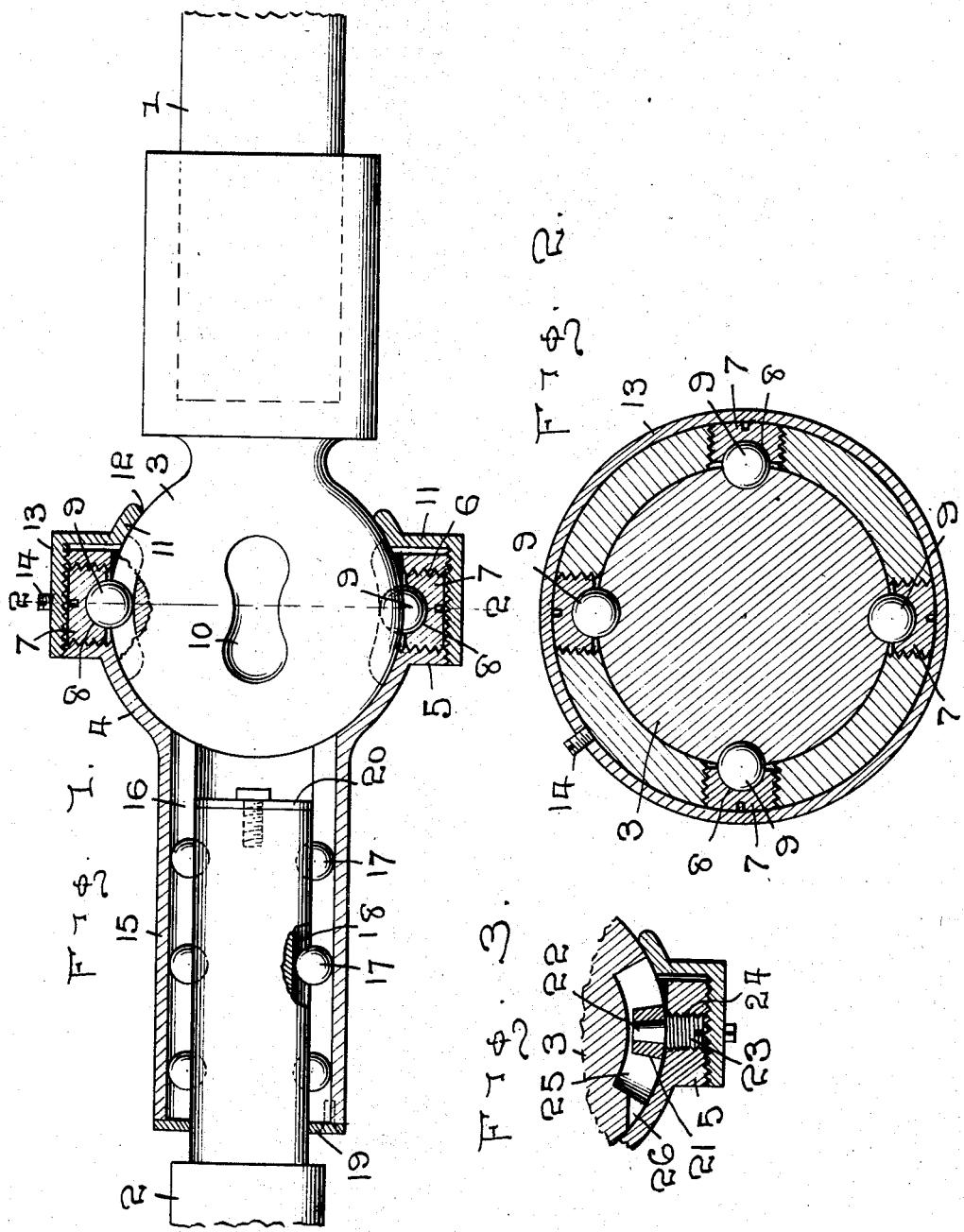

ALLEN H. FETZER, OF GALION, OHIO.

UNIVERSAL JOINT.

1,021,924.  Specification of Letters Patent.  Patented Apr. 2, 1912.

Application filed October 27, 1910. Serial No. 589,358.

*To all whom it may concern:*

Be it known that I, ALLEN H. FETZER, a citizen of the United States, residing at Galion, in the county of Crawford and State of Ohio, have invented certain new and useful Improvements in Universal Joints; and I do hereby declare the following to be a full, clear, and exact description of the invention, such as will enable others skilled in the art to which it appertains to make and use the same.

My invention relates to new and useful improvements in universal joints and is adapted more particularly to be used in connection with the driving shaft of a motor and my object is to provide a ball and socket to connect the driving shaft to the shaft of the motor.

A further object is to so arrange the universal joint that the driving shaft may be positioned at an angle to the shaft of the motor while rotating.

A further object is to provide ball or cone bearings to cause the ball and socket to rotate in unison.

A further object is to provide adjusting means for said cones or balls.

A further object is to provide adjustable means for holding the ball and socket together, and, a further object is to provide means for permitting the driving shaft to move longitudinally to compensate for the movement of the vehicle and at the same time cause the driving shaft to rotate with the universal joint.

Other objects and advantages will be hereinafter set forth and pointed out in the specification.

In the accompanying drawings, which are made a part of this application, Figure 1 is a detail sectional view of the universal joint. Fig. 2 is a sectional view as seen on line 2—2, Fig. 1, and, Fig. 3 is a detail sectional view of a slightly modified form of device.

Referring to the drawings in which similar reference numerals designate corresponding parts throughout the several views, 1 indicates the engine shaft and 2 indicates the driving shaft, said shafts being constructed in any preferred manner. Connected to the end of the engine shaft is a ball 3, over which is adapted to fit a socket 4, said socket being semi-globular to receive the ball and is of such size as to extend beyond the center of the ball. Surrounding the socket 4 and adjacent its free edge is a collar 5, through which are placed at intervals threaded openings 6 and in these openings are placed adjusting screws 7, the exterior of said screws being threaded to engage the threads of the openings. The inner ends of the screws are provided with seats 8, with which coöperate bearing balls 9, substantially one-half of the bearing balls being seated in the screws. The remaining portions of the bearing balls are entered in substantially 8-shaped openings 10 in the face of the ball, which cause the ball and socket to rotate together and in view of the length and shape of the openings, will permit pivotal action between the ball and socket.

The peripheral edge of the collar 5 is threaded to receive the threads of a cap 11, the body portion of the cap bearing upon the ball 3 to hold the ball seated in the socket, said body portion of the cap having a circular opening 12 therein, through which the stem of the ball 3 projects. The flange portion 13 of the cap after being turned onto the collar 5 until the body portion of the cap is moved into engagement with the ball, is locked against independent rotation of the socket by means of binding screws 14, which binding screws are entered through threaded openings in the flange and bind on the peripheral surface of the collar. The socket 4 is provided with a hollow sleeve 15 into which is introduced the end of the driving shaft 2 and extending longitudinally of said sleeve are races 16 to receive bearing balls 17, that portion of the driving shaft 2 entering the sleeve having similar races 18 to engage substantially one-half of bearing balls 17.

The balls 17 are held in their respective races by placing a plate 19 over the outer end of the sleeve 15 and a similar plate 20 onto the inner end of the shaft 2, said plates being such as to limit the movement of the bearing balls. By connecting the driving shaft to the sleeve in this manner, it will be readily seen that the universal joint and parts carrying the same may descend or rise a certain distance without affecting the longitudinal movement of the driving shaft and at the same time the driving shaft will be caused to rotate with the sleeve.

In Fig. 3 of the drawings is shown a slightly modified form of device in that a cone roller 21 is used instead of the bearing balls 9 and in this instance the rollers are mounted upon a stem 22 of a threaded stud 23, the stud being introduced through a threaded opening 24 of the collar 5. In order to readily assemble the socket and ball, the bearings are first placed in position and the socket then introduced over the ball, and in order to permit the balls 9 to enter the openings 10, one end of the openings 10 are slightly elongated, or as shown in Fig. 3, the end of the opening 25 may be cut out, as shown at 26, so that the cone roller will readily enter the opening 25.

In assembling the socket and ball together the balls 9 are entered into their respective seats in the adjusting screws 7 and the socket then entered over the ball its full distance when the adjusting screws 7 are turned to properly adjust the bearing balls in their respective openings. The cap 11 is then introduced into position over the opposite portion of the ball and turned onto the collar 5 until the curved portion of the cap is in proper engagement with the face of the ball. The binding screws 14 are then turned inwardly and forced into engagement with the periphery of the collar, thereby holding the cap against rotation in either direction. Should the parts of the ball or socket become worn the cap 11 can be turned farther onto the collar, thereby compensating for such wear, and likewise, should the bearing balls or their respective seats become worn the adjusting screws carrying the bearing balls may be properly rotated to obtain the requisite adjustment. In this way the socket can be readily removed from the ball without interfering in the adjustment of the bearing balls, and the socket can be locked onto the ball through the medium of the cap without employing bolts or other devices for holding the parts of the ball and socket together. It will likewise be seen that the universal joint can be swung upwardly or downwardly without interfering with the action of the driving shaft, and, it will further be seen that by providing the cap and attaching the same in the manner shown, the parts of the socket will be readily interchangeable.

What I claim is:

In a universal joint, a member having a ball thereon, said ball having elongated peripheral openings therein, a member having a ball-socket therein and having a radially extending peripherally-threaded flange surrounding the ball and ball-socket, said flange having threaded apertures therein, balls in the said openings and extending into the said apertures, screw-threaded members in the apertures contacting the balls for adjusting the same, and a threaded retaining ring screwed onto the said flange for retaining the ball member in the socket and retaining the screws in the apertures.

In testimony whereof I have signed my name to this specification in the presence of two subscribing witnesses.

ALLEN H. FETZER.

Witnesses:
FRANK PIGMAN,
JACOB SCHEERER.